July 7, 1936.   H. ROBINSON   2,046,533
POWER TRANSMISSION FOR CULINARY MACHINERY
Filed May 31, 1935   3 Sheets—Sheet 1

Inventor,
Henry Robinson
By
Attorney.

July 7, 1936. H. ROBINSON 2,046,533
POWER TRANSMISSION FOR CULINARY MACHINERY
Filed May 31, 1935 3 Sheets-Sheet 2

Inventor,
Henry Robinson,
By M. E. Judd
Attorney

July 7, 1936.　　　　　H. ROBINSON　　　　　2,046,533
POWER TRANSMISSION FOR CULINARY MACHINERY
Filed May 31, 1935　　　3 Sheets-Sheet 3
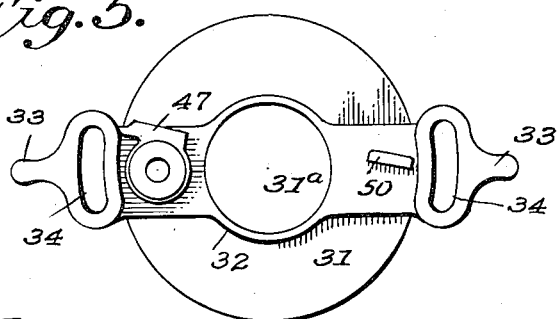
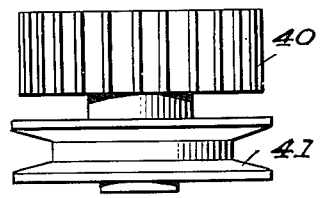
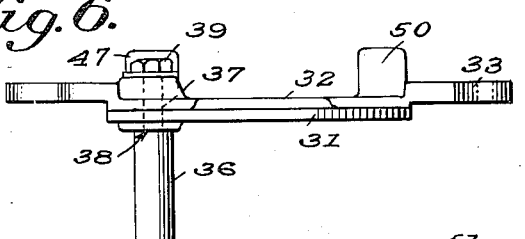
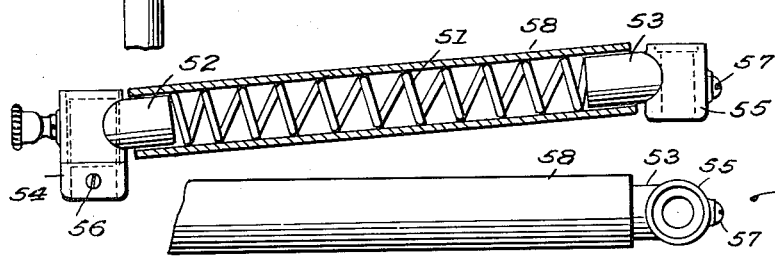
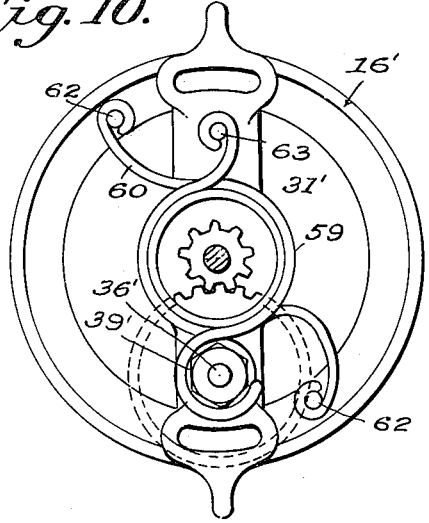
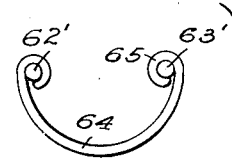
Inventor,
Henry Robinson.
By
Attorney Patented July 7, 1936

2,046,533

UNITED STATES PATENT OFFICE 2,046,533

POWER TRANSMISSION FOR CULINARY MACHINERY

Henry Robinson, Lindenhurst, N. Y.

Application May 31, 1935, Serial No. 24,451

18 Claims. (Cl. 74—242.13)

My invention relates to power transmission mechanism especially, but not exclusively, adapted for use in culinary machinery, and more particularly in vegetable paring and vegetable washing machines.

It is generally aimed to provide such a mechanism which is simple and economical in cost of production, installation and maintenance and one in which the assembly or organization is dependable, constant and efficient.

An object is to provide a drive or transmission of the character stated especially capable of being substantially horizontally disposed, and utilize a flexible endless driving means under constant tension, in combination with a novel motor supporting means attachable to the casing body or pan of the machine.

The various additional objects and advantages will become apparent from a consideration of the description following, taken in connection with accompanying drawings illustrating an operative embodiment.

In said drawings:

Figure 1 is a side elevation showing my improvements associated with a vegetable paring or vegetable washing machine;

Figure 5 is a plan view of the turnable tensioning element;

Figure 6 is a side elevation of said tensioning plate element having the pulley and pinion shaft attached;

Figure 7 is an elevation of the unitary pinion and pulley;

Figure 8 is a side elevation, partly broken away, of one form of spring device which may be employed;

Figure 9 is a plan view of said spring device;

Figure 10 is a plan view of the motor stand, plate element and modified form of spring means;

Figure 11 is a plan view of one of the spring members used in the form of Figure 10;

Figure 12 is a diagram showing the use of a further form of spring element in the motor stand and plate element combination; and, Figure 13 is a section taken on the line 13—13 of Figure 2.

Figure 2:
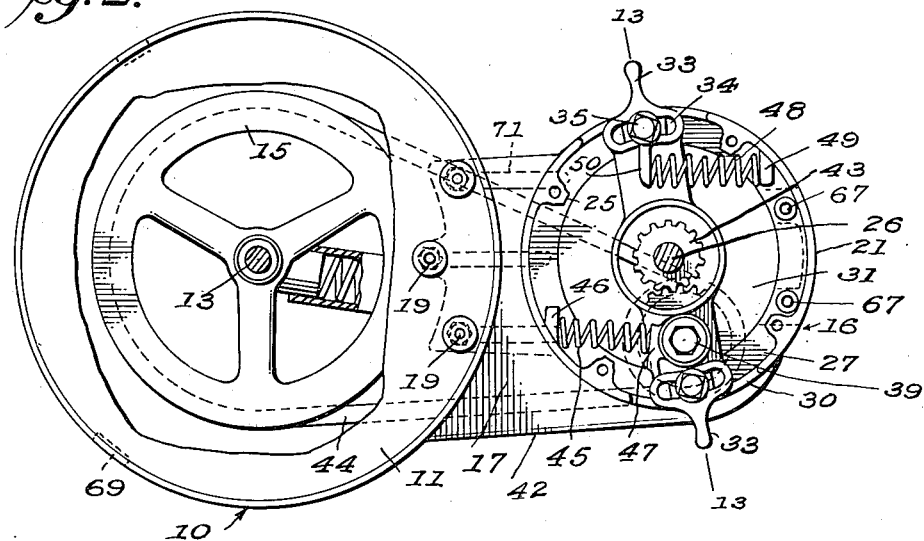
Figure 2 is a view partly broken away and partly in section, more particularly showing the parts of the transmission in plan.
Figure 3:
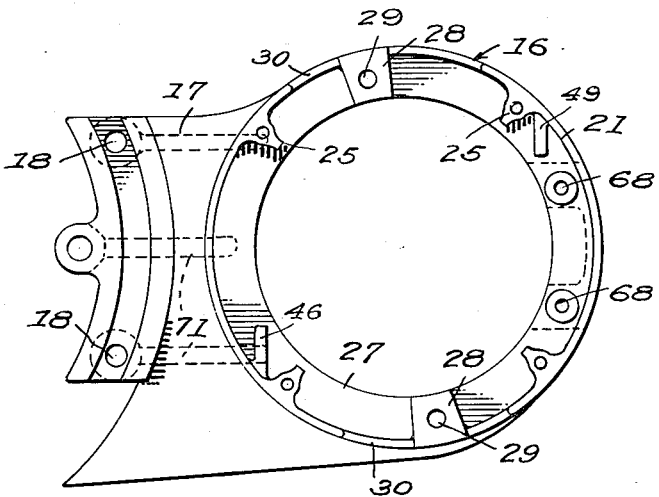
Figure 3 is a plan view of the support or stand for the driving motor.
Figure 4:
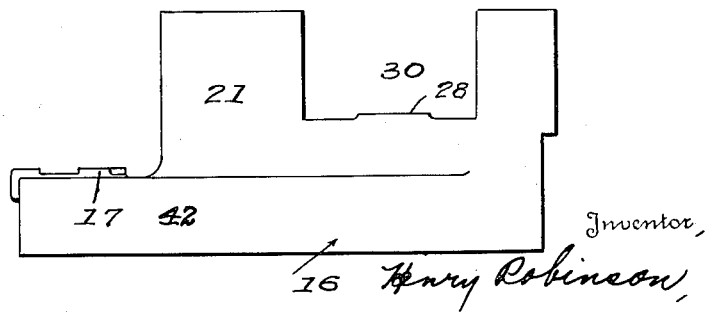
Figure 4 is a side elevation of said support or stand.

Referring specifically to the drawings, wherein like reference characters designate like or similar parts, 10 illustrates a vegetable paring or vegetable washing machine, as one type of machine with which the invention may be used, it being clear that the improvements are capable of broad application. Said machine 10 includes a casing or pan, such as the pan 11. The rotatable paring disk, washing element or the like of said machine is shown at 12, having a driving shaft 13 depending therefrom and suitably journaled in said pan 12. In accordance with the present invention, the pan 11 has an enlargement or depending flange at its bottom at 14, housing a pulley wheel 15 which is suitably fastened to said shaft 13.

A motor stand or support 16, conveniently formed as a casting, has an extension 17 provided with holes 18 through which bolts or screws 19 are passed to rigidly secure the plate against an under part of said casing or pan extending into a cut-away portion 20 thereof.

Said support 16 has an annular, upstanding wall 21 on the top of which an electric motor 22 at a flange 23 is seated. Said flange 23 has screws 24 passed therethrough and engaged in screw threaded bosses 25 on said wall 21, the motor depending partly into the support. Said motor 22 is driven by electric current supplied from any suitable source and has its shaft 26 depending into the support 16. On the interior of wall 21 is an inwardly extending, annular flange or rib 27 having raised portions 28 about screw threaded openings 29. At diametrically opposite locations, wall 21 is cut away at 30 adjacent said raised portions 28.

Fitted and journaled within the space afforded by said flange 27, concentric with motor shaft 26, is a plate or disk 31 having a part or lever 32 superposed thereon and rigidly fastened thereto in any suitable way. Said lever 32 at the portions beyond disk 31 rests and moves on the raised portions 28 with minimum friction and plate 31 and lever have a large central opening 31ᵃ. Handles 33 on said lever project outwardly through the cut away portions and adjacent to the same, arcuate slots 34 are provided concentric with the center of the motor shaft 26. Screw studs 35 extend through the slots 34, being threaded in the openings 29 and so proportioned as not to bind against the lever 32 or offer resistance to the turning thereof and of the plate 31 within the limits of the slots 34, the plate 31 and lever thus being freely mounted. Cylindrical washers 34' of the same height as slot 34 are located therein surrounding the studs 35, effectively preventing tipping of disk 31 and parts unitary therewith.

A stub shaft 36 has a reduced portion 37 rigidly fastened in an opening of the plate 31 and lever 32 by means of a shoulder 38 and nut 39 engaging opposite surfaces thereof. On the shaft 36 is suitably keyed or fastened a unitary pinion 40 and pulley 41; such parts being integral, if preferred, and housed within wall 21 and depending flange portion 42 of the motor stand.

Enmeshed with the teeth of the pinion 40 are the teeth of a pinion 43, which latter is fastened or keyed on the lower end of the motor shaft 26 and it will be noted that opening 31ª is sufficiently large to enable the pinion 43 to be readily passed therethrough.

It will be noted that the pulleys 15 and 41 are in the same horizontal plane and that both of them preferably have V-shaped peripheral grooves engaged by a flexible, endless belt 44 of similar V-shape in cross section. It is obvious that I may employ these pulleys and belt in pluralities if I wish, according to the load or drive desired.

The belt 44 or other endless driving member is constantly maintained taut and under the desired tension by suitable spring means. To this end, I may employ an expansive coil spring 45 engaging surfaces or portions 46 and 47 on the interior of wall 21 and lever 32. This single spring in many instances will suffice but I prefer to also employ a similar expansive coil spring 48 engaged with surfaces or portions 49 and 50 on the wall 21 and lever 32.

In lieu of or in addition to either or both of said springs 45 and 48, I may employ an expansive coil spring 51, engaging lugs 52 and 53 of tubular brackets 54 and 55, respectively, fastened by binding screws or otherwise at 56 and 57 to the lower ends of shafts 13 and 26, respectively. Spring 51 has a sheathing tube 58 thereover into the ends of which the lugs 52 and 53 are loosely telescoped.

It is obvious that many different forms of spring means may be employed to urge tensioning movement of the plate and lever 31—32. For instance, I may use the flat generally arcuate wire type shown in Figures 10 and 11. This form of spring has a large arcuate central portion 59 and terminal portions 60 curved reversely thereto and having hooks 61 at their ends. In Figure 10, a stand 16' corresponds to that at 16 and a lever and plate 31' corresponds to that at 31—32. Said stand 16' has pins 62 thereon and part 31' has a pin 63. Shaft 36' and nut 39' correspond to the parts 36 and 39. One of the springs of the form of Figure 11 is hooked about the nut 39' and the pin 62 remote thereto, while the other spring of the form of Figure 11 is hooked to the remaining pin 62 and the pin 63.

Still another modification of the spring means is suggested by Figure 12, where two arcuate springs 64 are employed in lieu of the two springs as used in Figure 10. Springs 64 have terminal hooks 65 which engage pins 62', 63' and nut 39'' corresponding to the parts 62, 63 and 39' of Figure 10.

Preferably three supporting legs are used, one at 66 interfitted in flange 42 and screwed as at 67 to threaded openings 68 in the flange or rib 27; the other legs 69 being secured by screws 70 to the pan or casing of the machine 10.

The extension 17 preferably has integral reinforcing ribs at 71.

By reason of the invention, the plate 31 and lever 32 are constantly urged in the desired direction by the spring means employed, maintaining the belt or endless driving member 44 taut and under the requisite tension. Slack is automatically taken up and wear is automatically compensated for. The necessity of having to rigidly secure the mounting for the pulley 41 is also overcome. The spring means thus functions dually. Should it be desired to dismantle the drive or remove the belt 44 for any reason, it is simply necessary through engagement with the handles 33 to remove the plate and lever 31—32 slightly clockwise to enable removal or displacement of the belt 44.

Various changes may be made within the spirit and scope of the invention.

I claim as my invention:

1. In a mechanism of the class described, an endless driving element, a member driven thereby, a member in driving relation with the endless driving element, a bodily movable element carrying one of said members on the side thereof opposite to said motor, a driving shaft for the other of said members extending through the bodily movable element, and spring means urging bodily movement of said last mentioned element to orbitally move said one of said members to maintain the first mentioned element taut and to maintain the parts in operative relation.

2. In a mechanism of the class described, an endless driving element, a member driven thereby, a member in driving relation with the endless driving element, a lever carrying one of said members, a stand journaling said lever at the periphery of the latter, said stand having a depending flange disposed about the second mentioned member and endless driving element, and spring means urging swinging movement of the lever to orbitally move the second mentioned member to tension the endless driving element.

3. In a mechanism of the class described, a driving shaft, a plate disposed concentrically about said shaft and through which the shaft extends, a driving member in driving relation to said shaft pivoted on said plate on the opposite side to said motor, a second driving member, an endless belt traversing said driving members, a stand supporting said motor and surrounding and journaling said plate at the periphery of the latter, and spring means urging rotation of said plate to orbitally move the first mentioned driving members to tension the belt.

4. In a mechanism of the class described, a motor stand, a motor supported by said stand having a depending shaft, a body plate journaled in said stand concentrically with said shaft, a driving member pivoted on said plate, means to drive the driving member from said shaft, a second driving member, an endless belt traversing said driving members, and spring means engaging said plate to orbitally move the first mentioned driving member about the axis of said shaft and stand urging rotation of said plate to tension the belt.

5. A mechanism according to claim 4 having a stub shaft on the lower plate on which the first driving member is journaled, brackets on said first mentioned shaft and stub shaft, said spring means engaging said brackets.

6. A mechanism according to claim 4 having a stub shaft on the said plate journaling the first driving member, brackets on said first mentioned shaft and stub shaft, studs on said brackets, a sheathing tube into the opposite ends of which said studs are loosely telescoped, and said spring means being within the sheathing tube and in engagement with said studs.

7. In a mechanism of the class described, a motor stand having an upstanding motor supporting wall, a motor on said wall having a depending shaft, a flange extending inwardly from said wall below the motor, said wall being partly cut away adjacent said flange, a plate journaled and disposed within said flange concentrically about said shaft, said plate having an operating handle extending through said cut away portion and having a slot, a guide member rising from the flange and disposed in said slot, a stub shaft depending from said plate, a driving member journaled on the stub shaft, means to drive the driving member from the first mentioned shaft, a second driving member, an endless driving element traversing said driving members, and spring means urging rotation of said plate to tension said endless driving element.

8. A mechanism according to claim 7, wherein said spring means consists of a coil spring or springs and engages surfaces on said plate and on said wall.

9. A mechanism according to claim 7 having a shaft for the second driving element, brackets on the lower ends of the latter shaft and the stub shaft, studs on the brackets, said spring means engaging said studs, and a sheathing about said spring means loosely telescoped at opposite ends with said studs.

10. A mechanism according to claim 7, in combination with a machine to be driven having a depending shaft on which the second driving member is mounted, said machine having flange means about the latter member cut away at the rear thereof, the motor stand having a depending flange about the first driving member and an extension interfitted in said cut away portion and fastened to the machine.

11. A mechanism according to claim 7, wherein said spring means is substantially flat and generally arcuate and has connecting hooks at opposite ends.

12. A mechanism according to claim 7, wherein said spring means comprises two expansive coil springs, said springs being on opposite sides of the plate and engaging said plate and said wall.

13. In a mechanism of the class described, a motor stand having an upstanding wall, a motor supported on said wall having a depending shaft, an annular flange extending inwardly from said wall below the motor, said wall being cut away adjacent said flange, a plate journaled concentrically about said shaft and within said flange, said plate having a part provided with slots concentric with the axis of said shaft and with a handle accessible through said cut away portion, said flange having raised portions on which said part rests, guide members in said slots rising from the raised portions, a stub shaft depending from said plate, intermeshing gears on the motor shaft and stub shaft, a driving member on the stub shaft, a second driving member, an endless driving element traversing said driving members, and spring means urging contra-clockwise rotation of said plate.

14. A mechanism according to claim 13 having said spring means within the motor stand in engagement with the latter and said plate.

15. A mechanism according to claim 7 wherein said stand has depending flange means disposed about the first mentioned driving member, said means and said endless driving element.

16. In a mechanism of the class described, a motor stand, a motor supported by said stand having a depending shaft, a body plate journaled in said stand concentrically with said shaft, a driving member pivoted on said plate, means to drive the driving member from said shaft, a second driving member, an endless belt traversing said driving members, a shaft on said plate constituting the pivot means for the first mentioned plate, and spring means bridging said shafts and urging rotation of the plate to orbitally move the first mentioned driving member about the axis of said shaft to tension the belt.

17. In a mechanism of the class described, a rotatable driving element, a rotatable member driven thereby, means mounting said member for orbital movement relatively to the driving element, a second rotatable driven member, an endless driving element traversing said driven members, spring means cushioning and positioning the first mentioned means and urging said orbital movement in a direction away from the second driven member, the movement of the first means being restricted solely by the engagement of the first driven member and endless driving element.

18. A mechanism according to claim 17 having one run of the endless driving element substantially parallel to a line passing through the axes of the rotatable driving element and second rotatable driven member, and the axes of the first rotatable driven member and second rotatable driven member being on opposite sides of a line at right angles to the first mentioned line passing through the axis of the driving element.

HENRY ROBINSON.